United States Patent [19]
Sotomura

[11] Patent Number: 5,869,206
[45] Date of Patent: Feb. 9, 1999

[54] ELECTRODE INCLUDING ORGANIC DISULFIDE COMPOUND AND METHOD OF PRODUCING THE SAME

[75] Inventor: Tadashi Sotomura, Kashiwara, Japan

[73] Assignee: Matsushita Electric Industrial Co., Ltd., Osaka-fu, Japan

[21] Appl. No.: 820,210

[22] Filed: Mar. 18, 1997

[30] Foreign Application Priority Data

Mar. 21, 1996 [JP] Japan .................................. 8-064922

[51] Int. Cl.$^6$ .................................................. H01M 4/60
[52] U.S. Cl. ............................................................ 429/213
[58] Field of Search ................................... 429/218, 213

[56] References Cited

U.S. PATENT DOCUMENTS

| | | | |
|---|---|---|---|
| 5,348,819 | 9/1994 | Uemachi et al. | 429/213 |
| 5,413,882 | 5/1995 | Uemachi et al. | 429/213 |
| 5,460,905 | 10/1995 | Skotheim . | |
| 5,516,598 | 5/1996 | Visco et al. | 429/42 |
| 5,518,841 | 5/1996 | Sotomura et al. . | |
| 5,532,077 | 7/1996 | Chu . | |
| 5,665,492 | 9/1997 | Sotomura | 429/213 |
| 5,686,201 | 11/1997 | Chu | 429/52 |
| 5,723,230 | 3/1998 | Naoi et al. | 429/104 |

FOREIGN PATENT DOCUMENTS

| | | |
|---|---|---|
| 4-155766 | 5/1992 | Japan . |
| 6-36797 | 2/1994 | Japan . |
| 6-251770 | 9/1994 | Japan . |

*Primary Examiner*—Maria Nuzzolillo
*Assistant Examiner*—Carol Chaney
*Attorney, Agent, or Firm*—Panitch Schwarze Jacobs & Nadel, P.C.

[57] ABSTRACT

An electrode of the present invention comprises a complex of at least one organic disulfide compound and at least one copper ion. The electrode maintains a high charging and discharging efficiency and has favorable charge and discharge cycle characteristic without losing a high energy density that is characteristic of the organic disulfide compound.

12 Claims, 4 Drawing Sheets

ELECTRODE INCLUDING ORGANIC DISULFIDE COMPOUND AND METHOD OF PRODUCING THE SAME

BACKGROUND OF THE INVENTION

The present invention relates to a composite electrode including an organic disulfide compound to be used in electrochemical elements such as batteries, electrochromic display devices, sensors, and memories, and also relates to a method of producing the same.

Conductive polymer electrodes have been studied intensively since the discovery of conductive polyacetylene in 1971, because application of conductive polymers for the electrode material may result in desirable electrochemical elements, such as batteries that are light in weight and have a high energy density, electrochromic devices of large areas, and biochemical sensors utilizing microelectrodes.

Since polyacetylene is unstable and not practical as electrodes, other $\pi$ electron conjugated conductive polymers have been examined. As a result, relatively stable polymers, such as polyaniline, polypyrrole, polyacene, and polythiophene have been found, and lithium secondary batteries utilizing these polymers for the cathode have been developed. An energy density of these batteries is considered to range from 40 to 80 Wh/kg.

Organic disulfide compounds have been proposed in U.S. Pat. No. 4,833,048 as an organic material that can further enhance an energy density. The most simplified form of such compounds is represented by the formula $M^+\text{-}^-S\text{-}R\text{-}S^-\text{-}M^+$, wherein R denotes an aliphatic or aromatic organic group, S indicates a sulfur atom, and M indicates a proton or metal cation. Such compounds are bonded to each other via S—S bonds by electrolytic oxidation, and form a polymer represented by $M^+\text{-}^-S\text{-}R\text{-}S\text{-}S\text{-}R\text{-}S\text{-}S\text{-}R\text{-}S^-\text{-}M^+$.

The thus formed polymer is regenerated into the original monomers by electrolytic reduction. A metal-sulfur secondary battery prepared by combining a metal M that supplies and captures cations ($M^+$) with an organic disulfide compound has been proposed in the U.S. patent mentioned above. This proposed metal-sulfur secondary battery is expected to have an energy density of not less than 150 Wh/kg, which is comparable to or even better than the conventional secondary batteries.

These organic disulfide compounds, however, have a problem; that is, repeated oxidation and reduction (i.e., charging and discharging) results in a gradual decrease of the electrode capacity. Oxidation (charging) of the organic disulfide compound yields a polydisulfide compound which is electrically insulating and has a poor ionic conductivity. The polydisulfide compound has poor solubility in electrolytes.

In contrast, organic disulfide monomers which are generated by reducing (discharging) the polydisulfide compound have high solubility in electrolytes.

Repeated oxidation and reduction accordingly causes part of disulfide monomers to be dissolved in an electrolyte and subsequently polymerized at a position apart from the original position in the electrode. Thus, the polydisulfide compound deposited apart from a conductive agent, such as carbon, is isolated from the electron/ion conductive network in the electrode and does not contribute to the electrode reactions.

Repeated oxidation and reduction increases the isolated polydisulfide compound and gradually lowers the capacity of the battery. The organic disulfide monomers having the high solubility actively move from the cathode to the separator, into the electrolyte, and even further to the anode. The battery with an electrode including an organic disulfide compound as the cathode accordingly has drawbacks, such as lowered charging and discharging efficiency and a shortened charge and discharge cycle life.

BRIEF SUMMARY OF THE INVENTION

The object of the present invention is thus to solve the above problems and provide an electrode that maintains high charging and discharging efficiency and has favorable charge and discharge cycle characteristic without losing the characteristic of a high energy density of the organic disulfide compound.

The present invention is directed to an electrode comprising a complex of at least one copper ion and at least one organic disulfide compound, wherein the organic disulfide compound contains at least one sulfur—sulfur bond, and wherein the sulfur—sulfur bond is cleaved when electrolytically reduced to form a sulfur-metal ion bond and the sulfur-metal ion bond is regenerated into the sulfur—sulfur bond when electrolytically oxidized, the metal ion including a proton.

In accordance with one preferable mode of the present invention, the electrode further comprises a conductive material.

In accordance with another preferable mode of the present invention, the electrode further comprises polyaniline.

It is preferable that a mixture comprising the complex and the conductive material, such as carbon power or polyaniline is supported by a conductive support member, such as a carbon sheet or a titanium foil.

The present invention is also directed to a method of producing an electrode, which comprises the steps of:

dissolving an organic disulfide compound in N-R-2-pyrrolidone, wherein R denotes a hydrogen atom or an alkyl group, to prepare a solution;

adding polyaniline to the solution to prepare a solution A;

dissolving a copper salt in N-R-2-pyrrolidone to prepare a solution B;

mixing the solution A with the solution B to obtain a mixture; and heating the mixture in an inert gas atmosphere or in a vacuum.

In accordance with one preferable mode the present invention, the method further comprises the step of applying the mixture of the solution A and the solution B onto a conductive support member, prior to the heating step.

The present invention further provides a lithium secondary battery comprising a cathode composed of the above-mentioned electrode, an anode, and a non-aqueous electrolyte. An electrode utilizing lithium as an active material, such as metal lithium, a lithium-containing alloy, or a lithium-containing composite oxide which can reversibly intercalate and deintercalate lithium, is applied for the anode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
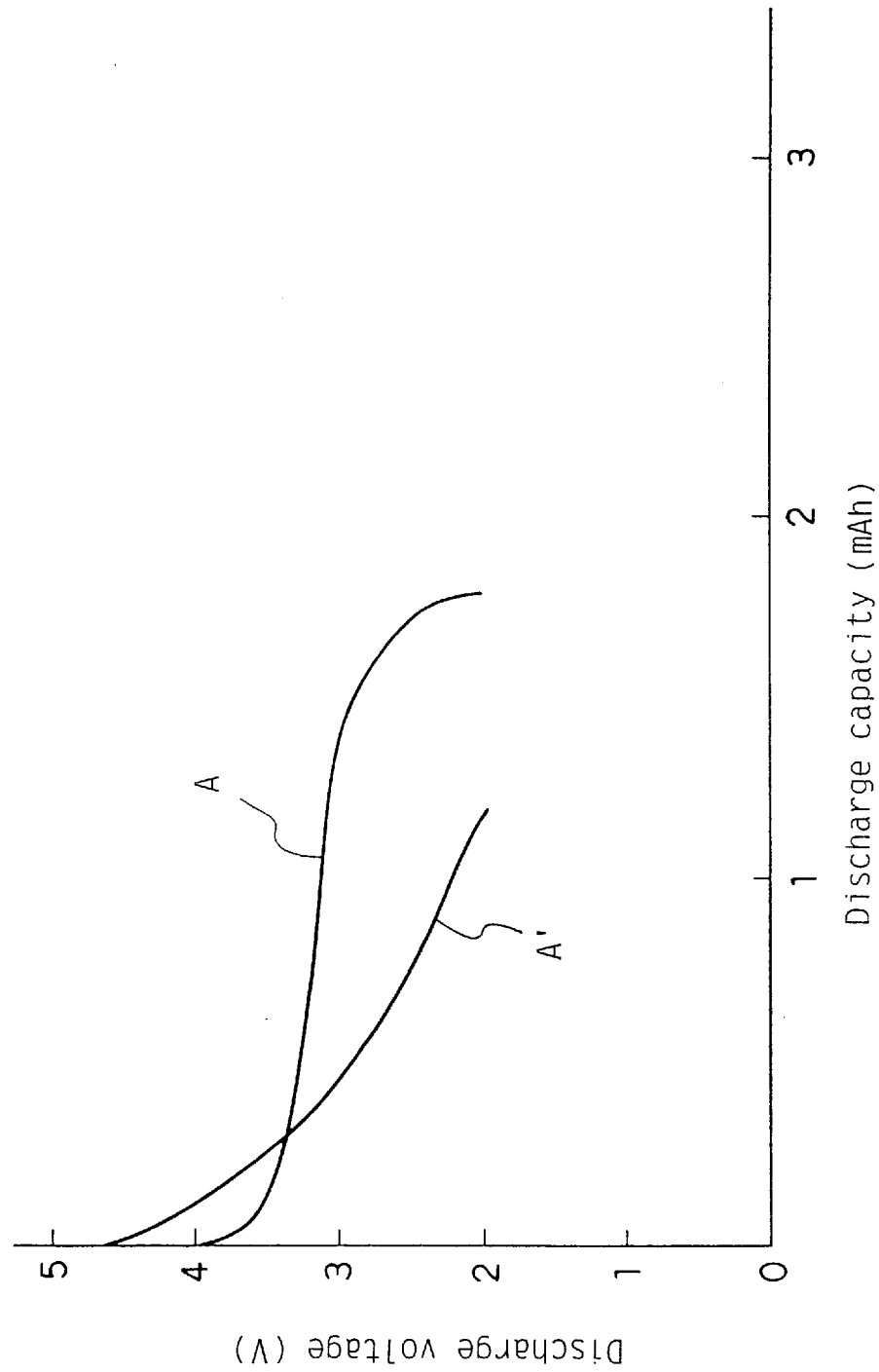
FIG. 1 is a graph showing discharge voltages of lithium secondary batteries respectively including an electrode A of Example 1 and an electrode A' of Comparative Example as cathodes.

The electrode of the present invention comprises a complex of at least one organic disulfide compound and at least one copper ion. In this complex, the organic disulfide compound functions as a ligand and is coordinated to the copper ion.

The organic disulfide compound used for preparing the complex is represented by the general formula of $(R(S)_y)_n$, wherein R represents an aliphatic or an aromatic group, S denotes a sulfur atom, and y and n, respectively, denote an integer of not less than 1 and an integer of not less than 2.

Available examples of the organic disulfide compounds include dithioglycol represented by $HSCH_2CH_2SH$ (hereinafter referred to as DTG), 2,5-dimercapto-1,3,4-thiadiazole represented by $C_2N_2S(SH)_2$ (hereinafter referred to as DMcT), s-triazine-2,4,6-trithiol represented by $C_3H_3N_3S_3$ (hereinafter referred to as TTA), 7-methyl-2,6,8-trimercaptopurine represented by $C_6H_6N_4S_3$ (hereinafter referred to as MTMP), and 4,5-diamino-2,6-dimercaptopyrimidine represented by $C_4H_6N_4S_2$ (hereinafter referred to as DDPy).

Commercially available compounds may be used as received. Also applicable are polymers of such organic disulfide compounds including their dimers and tetramers, which are obtained by polymerizing these organic disulfide compounds by a chemical polymerization process using an oxidizing agent, such as iodine, potassium ferricyanide, hydrogen peroxide, or by an electrolytic oxidation process.

Both monovalent and divalent copper ions may be used for preparing the complex, although divalent copper ions are preferable.

The complex of the organic disulfide compound and copper ion (hereinafter referred to as SSCu) is synthesized, for example, according to the following process. In this example, DMcT is used as the organic disulfide compound, although this process is also applicable to organic disulfide compounds other than DMcT.

A solution prepared by dissolving 0.76 g (6 millimoles) of iodine in 50 ml ethanol is added to a solution prepared by dissolving 1.1 g (6 millimoles) of copper(II) chloride 2-hydrate,($CuCl_2.2H_2O$) in 25 ml ethanol. The solution mixture is then added to a solution prepared by dissolving 1.8 g (12 millimoles) of DMcT in 50 ml ethanol, and a reddish orange complex immediately deposits as a solid substance.

The solid complex is separated by centrifugation and washed several times with hot alcohol. The solid complex is further washed, with ethyl ether and dried in a vacuum. This gives a complex in which 2 molecules of DMcT are coordinated to one copper ion, $Cu(C_2HN_2S_3)_2$.

DTG, TTA, MTMP, and DDPy used as the organic disulfide compounds respectively yield $Cu(C_2H_2S_2)_2$, $Cu_3(C_3N_3S_3)_2$, $Cu(C_6H_4N_4S_3)_2$, and $Cu(C_4H_4N_4S_2)_2$.

SSCu of the organic disulfide compound and the monovalent copper ion is synthesized by mixing an ethanol solution of copper (II) chloride reduced with $SO_2$ with an ethanol solution of the organic disulfide compound.

The powder of SSCu is molded under pressure to an electrode. A conductive material, such as conductive polymer powder like polyaniline, acetylene black, or metallic copper powder, may be mixed with the complex in the process of preparing the electrode.

Especially in the cathode including the complex and polyaniline, polyaniline functions as the conductive material as well as the ligand of the copper ion, while the organic disulfide compound acts as a dopant of polyaniline to form a complex. This gives a high-order metal polymer complex (hereinafter referred to as SSCuPAn), wherein the organic disulfide compound molecules, the polyaniline molecules, and the copper ions have mutual interactions in the three-dimensional manner.

This metal polymer complex keeps the organic disulfide compound more securely in the electrode, in comparison with the complex of the organic disulfide compound and the copper ion. The resultant electrode thus holds the high reversibility.

The preferable ratio of SSCu to polyaniline is 0.1 to 10 molecules of polyaniline per one molecule of the organic disulfide compound.

Polyaniline used for preparing SSCuPAn is obtained by polymerizing aniline or its derivative according to a chemical polymerization process or an electrolytic polymerization process. Especially preferable is reduced polyaniline in the de-doped state that can effectively capture the organic disulfide monomers.

The reduction degree index (RDI) of polyaniline is represented by the ratio $RDI=I_{640}/I_{340}$ of the intensity ($I_{640}$) of an absorption peak attributable to a quinone diimine structure appearing around 640 nm to the intensity ($I_{340}$) of an absorption peak attributable to a para-substituted benzene structure appearing around 340 nm, in an electron-absorption spectrum of the solution obtained by dissolving a trace amount of polyaniline in N-methyl-2-pyrrolidone.

Polyaniline having an RDI value of not larger than 0.5 is preferably used. The degree of de-doping of polyaniline is shown by conductivity. Polyaniline having a conductivity of not larger than $10^{-5}$ S/cm is preferably used.

The electrode containing SSCuPAn is obtained by mixing the SSCu powder with polyaniline powder. Especially when N-R-2-pyrrolidone (hereinafter referred to as NAP) is used as a solvent, the resultant electrode has the organic disulfide compound, the copper ion, and polyaniline that are homogeneously mixed in the molecular level.

The first step dissolves the organic disulfide compound in N-R-2-pyrrolidone to prepare a solution. The second step adds polyaniline powder to this solution to prepare a solution A, whereas dissolving the copper salt in N-R-2-pyrrolidone to prepare a solution B. The third step mixes the solution A with the solution B, preferably applies the mixture onto an appropriate conductive support member, and heats the mixture in an inert gas atmosphere or in a vacuum, to obtain an electrode containing SSCuPAn.

NAP used in the process of producing the SSCuPAn-containing electrode may be a commercially available reagent as received or after reduction of the water content to be not larger than 20 ppm with a zeolite adsorbent. Preferable examples of NAP are those having a hydrogen atom, a methyl group, an ethyl group, and a butyl group as R; that is, 2-pyrrolidone, N-methyl-2-pyrrolidone, N-ethyl-2-pyrrolidone, and N-butyl-2-pyrrolidone.

An organic polymer binder, such as, poly(vinyl pyrrolidone), poly(vinyl alcohol), or poly(vinyl pyridine) may be added to the electrode of the present invention. A gel electrolyte may also be added to the electrode material. The gel electrolyte is obtained by gelling an organic electrolyte with a polymer, such as polyacrylonitrile, polyethylene oxide, polyvinylidene fluoride, or polyacrylic acid. The organic electrolyte is prepared by dissolving a lithium salt, such as $LiBF_4$, $LiPF_6$, $LiAsF_6$, $LiClO_4$, $LiCF_3SO_3$, or $LiN(CF_3SO_2)_2$ in a non-protic solvent, such as propylene carbonate or ethylene carbonate.

The present invention provides an electrode, from which a secondary battery having a high energy density can be prepared. The resultant secondary battery has less release of the active material from the electrode in the course of charging and discharging and less reduction of the discharging capacity in the course of charging and discharging. The present invention also provides an electrode that can give a flat discharge voltage.

In all the examples discussed below, the electrode of the present invention is applied to the batteries. The electrode of the present invention may, however, be used as a counter electrode to give electrochromic devices having high coloring and fading rates and biochemical sensors, for example, glucose sensors having a high response. The electrode of the present invention also gives electrochemical analog memories having high writing and reading rates.

The present invention will be understood more clearly according to the examples discussed below.

EXAMPLE 1

One gram of $Cu(C_2HN_2S_3)_2$ powder, that is, the complex synthesized from copper(II) chloride 2-hydrate and DMcT, was mixed with 0.05 g of acetylene black powder. An electrolyte prepared by dissolving $LiBF_4$ in a solvent mixture of propylene carbonate and ethylene carbonate was gelled with polyacrylonitrile. The gel electrolyte thus obtained was diluted with acetonitrile.

One gram of the diluted gel electrolyte solution was added to the mixture. The slurry thus obtained was applied on a porous carbon sheet composed of a fluorocarbon resin and acetylene black and having dimensions of 5×10 cm and a thickness of 50 $\mu$m, and subsequently heated at 60° C. in a vacuum. This gave an electrode A having a thickness of 78 $\mu$m including the carbon sheet.

The gel electrolyte solution was prepared by dissolving 2.3 g of $LiBF_4$ in a solvent mixture containing 10.5 g of propylene carbonate and 7.9 g of ethylene carbonate, adding 3 g of polyacrylonitrile powder to the resultant organic electrolyte, heating the mixture to 100° C. for dissolution of polyacrylonitrile powder, and diluting the gel electrolyte with 20 g of acetonitrile.

COMPARATIVE EXAMPLE 1

A slurry obtained by mixing 1 g of DMCT powder with 0.05 g of acetylene black powder and 1 g of the gel electrolyte solution used in Example 1 was applied on the porous carbon sheet and heated at 60° C. in a vacuum. This gave an electrode A' having a thickness of 82 $\mu$m including the carbon sheet.

EXAMPLE 2

A slurry prepared by mixing 1 g of $Cu_3(C_3N_3S_3)_2$ powder, that is, the complex synthesized from copper(II) chloride 2-hydrate and TTA, with 0.05 g of acetylene black powder, and 1 g of the gel electrolyte solution used in Example 1 was applied on a porous carbon sheet composed of a fluorocarbon resin and acetylene black and having dimensions of 5×10 cm and a thickness of 50 $\mu$m, and subsequently heated at 60° C. in a vacuum. This gave an electrode B having a thickness of 85 $\mu$m including the carbon sheet.

COMPARATIVE EXAMPLE 2

A slurry prepared by mixing 1 g of DMcT powder with 0.05 g of acetylene black powder and 1 g of the gel electrolyte solution used in Example 1 was applied on the porous carbon sheet and heated at 60° C. in a vacuum. This gave an electrode B' having a thickness of 88 $\mu$m including the carbon sheet.

EXAMPLE 3

A solution was prepared by dissolving 1.5 g of DMcT in 10 g of N-methyl-2-pyrrolidone (hereinafter referred to as NMP). De-doped reduced polyaniline having a conductivity of $10^{-8}$ S/cm and an RDI value of 0.26 was obtained by de-doping polyaniline (manufactured by Nitto Denko Corp., trade name: Anilead) in an alkaline solution and then reducing the de-doped polyaniline with hydrazine. Addition of 1.0 g of the de-doped reduced polyaniline powder to the solution yielded a bluish green, viscous DMcT-polyaniline (hereinafter referred to as PAn)-NMP solution.

A solution prepared by dissolving 0.75 g of anhydrous copper (II) chloride in 5 g of NMP was then added to the DMcT-PAn-NMP solution. This gave a viscous ink. The ink was applied onto a titanium foil current-collector having dimensions of 5×8 cm and a thickness of 30 $\mu$m, and subsequently dried at 80° C. in a vacuum for two hours. This gave an electrode C having a thickness of 55 $\mu$m including the titanium foil.

COMPARATIVE EXAMPLE 3

The DMcT-PAn-NMP solution used in Example 3 was applied onto a titanium foil current-collector and subsequently dried at 80° C. in a vacuum for two hours. This gave an electrode C' having a thickness of 50 $\mu$m including the titanium foil.

EXAMPLE 4

A solution was prepared by dissolving 1.8 g of TTA in 10 g of NMP. De-doped reduced polyaniline having a conductivity of $10^{-8}$ S/cm and an RDI value of 0.28 was obtained by de-doping polyaniline (manufactured by Nitto Denko Corp., trade name: Anilead) in an alkaline solution and then reducing the de-doped polyaniline with hydrazine. Addition of 1.0 g of the de-doped reduced polyaniline powder to the solution yielded a bluish green, viscous TTA-PAn-NMP solution.

A solution prepared by dissolving 1.15 g of anhydrous copper (II) chloride in 5 g of NMP was then added to the TTA-PAn-NMP solution. This gave a viscous ink. The ink was applied onto a titanium foil current-collector having dimensions of 5×8 cm and a thickness of 30 $\mu$m, and subsequently dried at 80° C. in a vacuum for two hours. This gave an electrode D having a thickness of 60 $\mu$m including the titanium foil.

COMPARATIVE EXAMPLE 4

The TTA-PAn-NMP solution used in Example 4 was applied onto a titanium foil current-collector and subsequently dried at 80° C. in a vacuum for two hours. This gave an electrode D' having a thickness of 58 μm including the titanium foil.

Evaluation of Electrode Performances

Batteries A, B, C, D, A', B', C', and D' (2×2 cm square) were prepared to include the electrodes A, B, C, D, A', B', C', and D' obtained in Examples 1, 2, 3, and 4 and Comparative Example 1, 2, 3, and 4 as cathodes, metallic lithium of 0.3 mm in thickness as an anode, and a gel electrolyte of 0.6 mm in thickness as a separator layer. The gel electrolyte was obtained by gelling 3.0 g of polyacrylonitrile with 20.7 g of a propylene carbonate/ethylene carbonate solution (1:1 ratio by volume) containing 1M $LiBF_4$ dissolved therein.

Figure 2:
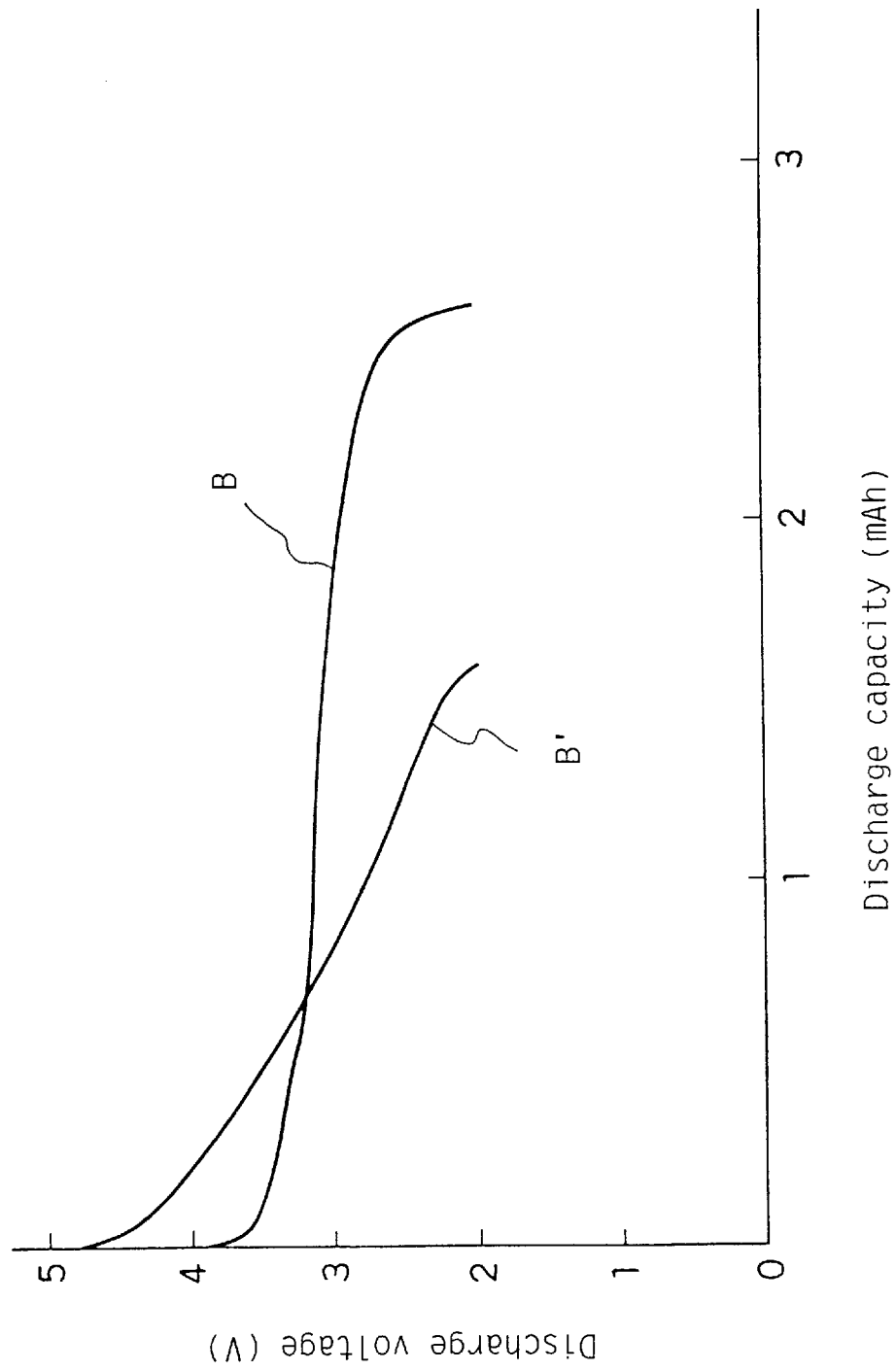
FIG. 2 is a graph showing discharge voltages of lithium secondary batteries respectively including an electrode B of Example 2 and an electrode B' of Comparative Example as cathodes.
Figure 3:
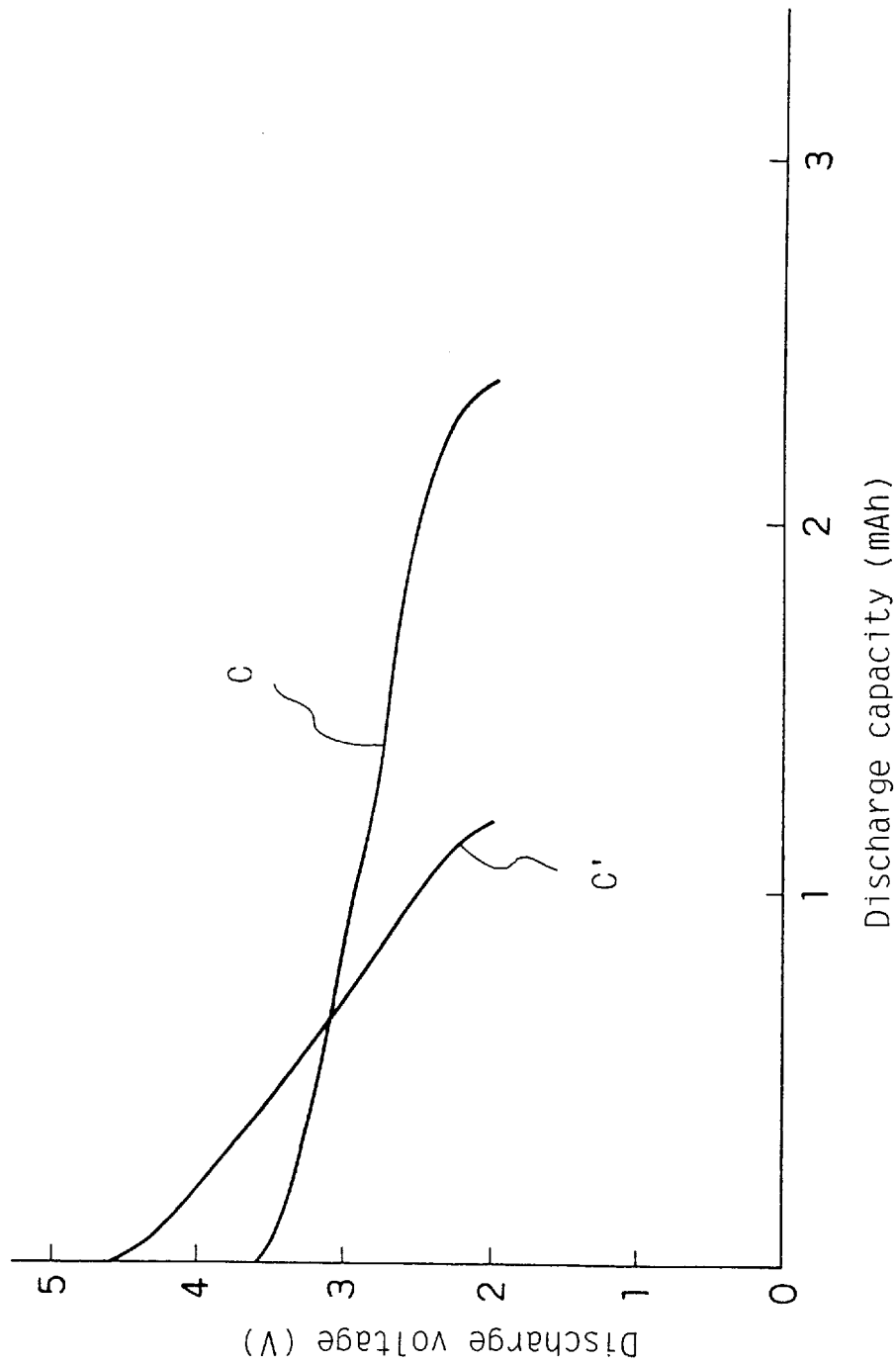
FIG. 3 is a graph showing discharge voltages of lithium secondary batteries respectively including an electrode C of Example 3 and an electrode C' of Comparative Example as cathodes.
Figure 4:
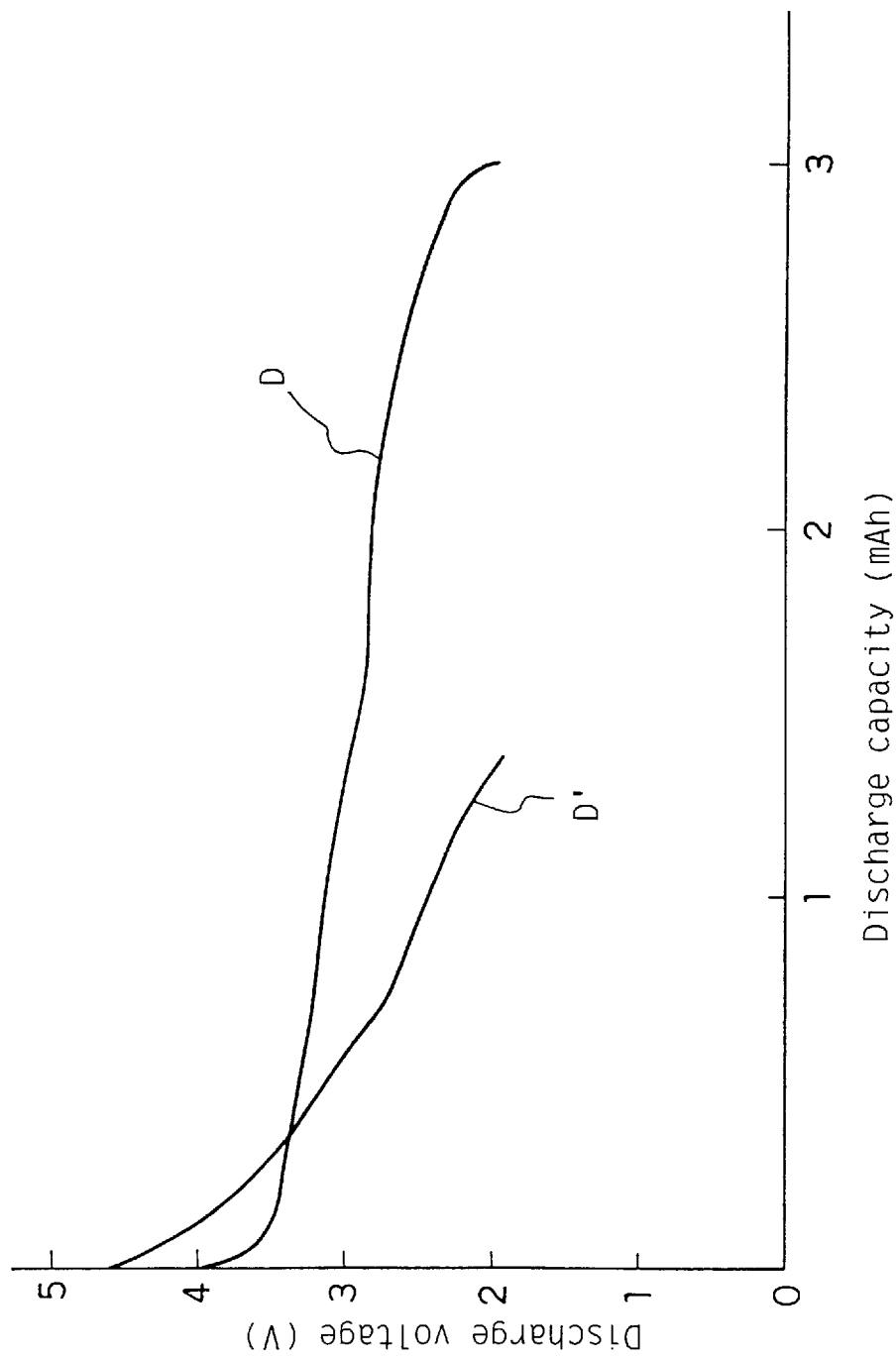
FIG. 4 is a graph showing discharge voltages of lithium secondary batteries respectively including an electrode D of Example 4 and an electrode D' of Comparative Example as cathodes.

The batteries A to D and A' to D' were repeatedly charged and discharged in the range of 4.65 to 2.0 V at a constant current of 0.2 mA at 20° C., and the discharging capacity (unit: mAh) was measured in each charge and discharge cycle for evaluation of the charge and discharge cycle characteristic. The results of measurement are shown in Table 1. FIGS. 1, 2, 3, and 4 respectively show the discharge voltages at the fifth cycle of the batteries A and A', the batteries B and B', the batteries C and C', and the batteries D and D'.

TABLE 1

| Battery | Discharge capacity (unit: mAh) charge/discharge cycle | | | |
|---|---|---|---|---|
| | 1 | 5 | 50 | 100 |
| A | 1.6 | 1.8 | 1.8 | 1.7 |
| A' | 1.4 | 1.2 | 0.4 | 0.2 |
| B | 2.4 | 2.6 | 2.4 | 2.2 |
| B' | 2.0 | 1.6 | 0.8 | 0.4 |
| C | 1.8 | 2.4 | 2.5 | 2.4 |
| C' | 1.6 | 1.2 | 0.6 | 0.2 |
| D | 2.8 | 3.0 | 2.8 | 2.6 |
| D' | 2.2 | 1.4 | 0.6 | 0.3 |

As clearly understood from the above results, in the batteries using the electrodes of Examples 1 through 4 according to the present invention, the discharge capacity is less decreased during the charge-discharge cycles, in comparison with the batteries using the corresponding electrodes of Comparative Examples. The batteries using the electrodes of Examples provide comparatively flat discharge voltages in the range of 3.5 to 2.5 V, in comparison with the batteries using the corresponding electrodes of Comparative Examples.

The entire disclosure of Japanese Patent Application No. Hei8-64922 filed on Mar. 21, 1996 including specification, claims, drawings and summary are incorporated herein by reference in its entirety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. An electrode comprising a conductive support member, wherein said conductive support member is a carbon sheet or a titanium foil, and a mixture supported by said conductive support member, said mixture comprising a complex of at least one copper ion and at least one organic disulfide compound, and a conductive material, wherein said organic disulfide compound contains at least one sulfur—sulfur bond, and wherein said sulfur—sulfur bond is cleaved when electrolytically reduced to form a sulfur-metal ion bond, and said sulfur-metal ion bond is regenerated into said sulfur—sulfur bond when electrolytically oxidized, said metal ion including a proton.

2. The electrode of claim 1 wherein said mixture further comprises polyaniline.

3. The electrode of claim 1 wherein said mixture further comprises a gel electrolyte.

4. The electrode of claim 2 wherein said mixture further comprises a gel electrolyte.

5. The electrode of claim 1 wherein said conductive material is carbon powder or metallic copper powder.

6. The electrode of claim 2 wherein said conductive material is carbon powder or metallic copper powder.

7. A lithium secondary battery comprising a cathode, wherein said cathode comprises the electrode of claim 1, an anode comprising lithium as an active material, and a non-aqueous electrolyte.

8. An electrode comprising a conductive support member, wherein said conductive support member is a carbon sheet or a titanium foil, and a mixture supported by said conductive support member, said mixture comprising a complex of at least one copper ion and at least one organic disulfide compound, and polyaniline, wherein said organic disulfide compound contains at least one sulfur—sulfur bond, and wherein said sulfur—sulfur bond is cleaved when electrolytically reduced to form a sulfur-metal ion bond, and said sulfur-metal ion bond is regenerated into said sulfur—sulfur bond when electrolytically oxidized, said metal ion including a proton.

9. The electrode of claim 8 wherein said mixture further comprises a gel electrolyte.

10. A lithium secondary battery comprising a cathode, wherein said cathode comprises the electrode of claim 8, an anode comprising lithium as an active material, and a non-aqueous electrolyte.

11. A method of producing an electrode including an organic disulfide compound, said method comprising the steps of:

dissolving an organic disulfide compound in N-R-2-pyrrolidone, where R denotes a hydrogen atom or an alkyl group, to prepare a solution, wherein said-organic disulfide compound contains at least one sulfur—sulfur bond, and wherein said sulfur—sulfur bond is cleaved when electrolytically reduced to form a sulfur-metal ion (including proton) bond and said sulfur-metal ion bond is regenerated into said sulfur—sulfur bond when electrolytically oxidized, said metal ion including a proton;

adding polyaniline to said solution to prepare a solution A;

dissolving a copper salt in N-R-2-pyrrolidone to prepare a solution B;

mixing said solution A with said solution B to obtain a mixture; and heating said mixture in an inert gas atmosphere or in a vacuum.

12. A method in accordance with claim 11, further comprising the step of applying said mixture of said solution A and said solution B onto a conductive support member, prior to said heating step.

* * * * *